US00RE49746E

(19) United States
(12) Reissued Patent
Koo

(10) Patent Number: US RE49,746 E
(45) Date of Reissued Patent: *Dec. 5, 2023

(54) SYSTEM AND METHOD FOR CORRECTING POSITION INFORMATION OF SURROUNDING VEHICLE

(71) Applicant: HYUNDAI MOBIS Co., Ltd, Seoul (KR)

(72) Inventor: Bon Wook Koo, Yongin-si (KR)

(73) Assignee: Hyundai Mobis Co., Ltd., Seoul (KR)

( * ) Notice: This patent is subject to a terminal disclaimer.

(21) Appl. No.: 16/716,840

(22) Filed: Dec. 17, 2019

Related U.S. Patent Documents

Reissue of:
(64) Patent No.: 9,836,961
Issued: Dec. 5, 2017
Appl. No.: 14/811,156
Filed: Jul. 28, 2015

U.S. Applications:
(63) Continuation of application No. 16/540,257, filed on Aug. 14, 2019, now Pat. No. Re. 48,288, which is an application for the reissue of Pat. No. 9,836,961.

(30) Foreign Application Priority Data

Nov. 11, 2014 (KR) ..... 10-2014-0156134

(51) Int. Cl.
*G08G 1/01* (2006.01)
*G08G 1/16* (2006.01)
(Continued)

(52) U.S. Cl.
CPC ..... *G08G 1/0137* (2013.01); *G01S 13/931* (2013.01); *G06V 20/58* (2022.01);
(Continued)

(58) Field of Classification Search
CPC ..... G06K 9/3258; G06K 9/00805; G06K 2209/15; G08G 1/20; G08G 1/096791;
(Continued)

(56) References Cited

U.S. PATENT DOCUMENTS 6,766,038 B1 * 7/2004 Sakuma ..... G01P 3/806 340/933
7,982,634 B2 7/2011 Arrighetti
(Continued)

FOREIGN PATENT DOCUMENTS

CN 101221049 A 7/2008
CN 102460535 A 5/2012
(Continued)

OTHER PUBLICATIONS

Chinese Office Action dated Aug. 31, 2017 in Counterpart Chinese Patent Application No. 201510564809.1 (9 pages in Chinese).
(Continued)

*Primary Examiner* — Deandra M Hughes
(74) *Attorney, Agent, or Firm* — NSIP Law

(57) ABSTRACT

The present invention relates to a system and a method for correcting position information of a surrounding vehicle, which provide accurate position information of a surrounding vehicle by correcting the position information of the surrounding vehicle received through vehicle-to-vehicle communication, and identifies a license-plate number of a front vehicle through a sensor mounted in a vehicle, calculates a position of the front vehicle, and compare position information, which is included in information including the identified number of the front vehicle in information received from the surrounding vehicle, with the calculated position of the front vehicle to correct the position information of the surrounding vehicle.

18 Claims, 3 Drawing Sheets

(51) Int. Cl.

| | |
|---|---|
| ***G08G 1/00*** | (2006.01) |
| ***G01S 13/93*** | (2020.01) |
| ***G08G 1/017*** | (2006.01) |
| ***G08G 1/04*** | (2006.01) |
| ***G06V 20/58*** | (2022.01) |
| ***G06V 20/62*** | (2022.01) |
| ***G01S 13/931*** | (2020.01) |
| ***G08G 1/0967*** | (2006.01) |

(52) U.S. Cl.
CPC ..... *G06V 20/63* (2022.01); *G08G 1/0112* (2013.01); *G08G 1/0175* (2013.01); *G08G 1/04* (2013.01); *G08G 1/09675* (2013.01); *G08G 1/096716* (2013.01); *G08G 1/096791* (2013.01); *G08G 1/163* (2013.01); *G08G 1/166* (2013.01); *G08G 1/20* (2013.01); *G01S 2013/9325* (2013.01); *G06V 20/625* (2022.01)

(58) Field of Classification Search
CPC .. G08G 1/09675; G08G 1/163; G08G 1/0112; G08G 1/096716; G08G 1/166; G08G 1/0137; G08G 1/04; G01S 13/931; G01S 2013/9325
See application file for complete search history.

(56) References Cited

U.S. PATENT DOCUMENTS

| | | | | |
|---|---|---|---|---|
| 8,520,695 | B1 | 8/2013 | Rubin et al. | |
| 9,147,353 | B1 | 9/2015 | Slusar | |
| 9,360,328 | B2 * | 6/2016 | You | G01C 21/26 |
| 9,630,625 | B2 | 4/2017 | Shin et al. | |
| 9,836,961 | B2 * | 12/2017 | Koo | G08G 1/0175 |
| 9,892,567 | B2 | 2/2018 | Binion et al. | |
| 10,091,855 | B2 | 10/2018 | Van Winkle | |
| 10,518,877 | B2 * | 12/2019 | Levien | G08G 5/0069 |
| RE48,288 | E * | 10/2020 | Koo | G06K 9/3258 |
| 10,843,685 | B2 | 11/2020 | Stählin | |
| 2004/0230373 | A1 | 11/2004 | Tzamaloukas | |
| 2006/0123051 | A1 * | 6/2006 | Hofman | G06K 9/6857 |
| 2007/0109111 | A1 | 5/2007 | Breed et al. | |
| 2007/0265777 | A1 * | 11/2007 | Munakata | G01C 21/26 701/301 |
| 2009/0237291 | A1 * | 9/2009 | Sakuma | G01S 5/0072 342/107 |
| 2010/0036578 | A1 * | 2/2010 | Taguchi | B60K 31/0008 701/93 |
| 2010/0052944 | A1 * | 3/2010 | Luke | B60W 30/02 340/903 |
| 2010/0112529 | A1 * | 5/2010 | Miura | B60T 8/3275 434/65 |
| 2010/0164789 | A1 | 7/2010 | Basnayake | |
| 2010/0214085 | A1 | 8/2010 | Avery et al. | |
| 2011/0109475 | A1 | 5/2011 | Basnayake et al. | |
| 2012/0029813 | A1 | 2/2012 | Tajima et al. | |
| 2012/0287276 | A1 * | 11/2012 | Dwivedi | G06K 9/00825 348/148 |
| 2012/0290146 | A1 | 11/2012 | Dedes et al. | |
| 2012/0303176 | A1 | 11/2012 | Wong et al. | |
| 2013/0030687 | A1 * | 1/2013 | Shida | G01S 5/0072 701/301 |
| 2013/0060443 | A1 * | 3/2013 | Shida | B60K 31/0008 701/96 |
| 2013/0093618 | A1 | 4/2013 | Oh et al. | |
| 2013/0131976 | A1 * | 5/2013 | Hubbard | G01C 21/20 701/412 |
| 2013/0188837 | A1 | 7/2013 | Takahashi | |
| 2013/0238181 | A1 | 9/2013 | James | |
| 2013/0265414 | A1 * | 10/2013 | Yoon | B60W 30/0953 348/118 |
| 2014/0032100 | A1 * | 1/2014 | Park | G01C 21/30 701/446 |
| 2014/0070980 | A1 | 3/2014 | Park | |
| 2014/0292545 | A1 * | 10/2014 | Nemoto | G08G 1/163 340/988 |
| 2014/0300743 | A1 * | 10/2014 | Kumon | B60R 1/00 348/148 |
| 2014/0375813 | A1 * | 12/2014 | Lee | G08G 1/017 348/148 |
| 2015/0002620 | A1 * | 1/2015 | Shin | G06K 9/00805 348/36 |
| 2015/0022426 | A1 | 1/2015 | Ng-Throw-Hing et al. | |
| 2015/0073705 | A1 * | 3/2015 | Hiwatashi | G01S 19/48 701/468 |
| 2015/0081202 | A1 | 3/2015 | Levin | |
| 2015/0146605 | A1 | 5/2015 | Rubin et al. | |
| 2015/0153178 | A1 * | 6/2015 | Koo | G01C 21/165 701/472 |
| 2015/0170522 | A1 | 6/2015 | Noh | |
| 2015/0178998 | A1 * | 6/2015 | Attard | G07C 5/008 701/23 |
| 2015/0185735 | A1 * | 7/2015 | Liang | G05D 1/0234 701/523 |
| 2015/0200957 | A1 | 7/2015 | Zhang et al. | |
| 2015/0201120 | A1 * | 7/2015 | Irie | G06K 9/00825 348/148 |
| 2017/0154531 | A1 | 6/2017 | Funabashi | |
| 2018/0151072 | A1 * | 5/2018 | Altinger | G08G 1/04 |
| 2018/0209795 | A1 | 7/2018 | Okuyama | |
| 2019/0035279 | A1 | 1/2019 | Tang et al. | |

FOREIGN PATENT DOCUMENTS

| | | | |
|---|---|---|---|
| CN | 102844800 | A | 12/2012 |
| CN | 103124994 | A | 5/2013 |
| CN | 103733084 | A | 4/2014 |
| JP | 2009-230390 | A | 10/2009 |
| JP | 2009-257763 | A | 11/2009 |
| JP | 2011-175572 | A | 9/2011 |
| WO | WO 2013/115470 | A1 | 8/2013 |

OTHER PUBLICATIONS

U.S. Appl. No. 16/540,257, filed Aug. 14, 2019, Bon Wook Koo, Hyundai Mobis Co., Ltd.
U.S. Appl. No. 16/716,787, filed Dec. 17, 2019, Bon Wook Koo, Hyundai Mobis Co., Ltd.
U.S. Appl. No. 17/021,271, filed Sep. 15, 2020, Bon Wook Koo, Hyundai Mobis Co., Ltd.
U.S. Appl. No. 17/021,405, filed Sep. 15, 2020, Bon Wook Koo, Hyundai Mobis Co., Ltd.
U.S. Appl. No. 17/021,695, filed Sep. 15, 2020, Bon Wook Koo, Hyundai Mobis Co., Ltd.
U.S. Appl. No. 17/021,867, filed Sep. 15, 2020, Bon Wook Koo, Hyundai Mobis Co., Ltd.
U.S. Appl. No. 17/021,915, filed Sep. 15, 2020, Bon Wook Koo, Hyundai Mobis Co., Ltd.
Korean Office Action dated Sep. 23, 2020, in counterpart Korean Patent Application No. 10-2014-0156134 (5 pages in Korean, no English translation).
Korean Office Action dated Sep. 23, 2020, in counterpart Korean Patent Application No. 10-2019-0091123 (5 pages in Korean, no English translation).
Korean Office Action dated Sep. 23, 2020, in counterpart Korean Patent Application No. 10-2019-0091124 (5 pages in Korean, no English translation).

* cited by examiner

SYSTEM AND METHOD FOR CORRECTING POSITION INFORMATION OF SURROUNDING VEHICLE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

*Notice: More than one reissue application has been filed for a reissue of U.S. Pat. No. 9,836,961. The reissue applications are Reissue application Ser. No. 16/540,257 filed on Aug. 14, 2019, now U.S. Reissue Pat. No. RE48,288 issued on Oct. 27, 2020; Continuation Reissue application Ser. Nos. 16/716,787 and 16/716,840 (the present continuation reissue application) both filed on Dec. 17, 2019; and Continuation Reissue application Ser. Nos. 17/021,271, 17/021,405, 17/021,695, 17/021,867, and 17/021,915 all filed on Sep. 15, 2020. Reissue application Ser. No. 16/540,257 is for a reissue of U.S. Pat. No. 9,836,961. Continuation Reissue application Ser. Nos. 16/716,787, 16/716,840, 17/021,271, 17/021,405, 17/021,695, 17/021,867, and 17/021,915 are all continuation reissue applications of Reissue application Ser. No. 16/540,257, and are all for a reissue of U.S. Pat. No. 9,836,961.*

This *reissue* application *is a continuation reissue application of Reissue application Ser. No. 16/540,257 filed on Aug. 14, 2019, now U.S. Reissue Pat. No. RE48,288 issued on Oct. 27, 2020, which is for a reissue of U.S. Pat. No. 9,836,961 issued on Dec. 5, 2017, from application Ser. No. 14/811,156 filed on Jul. 28, 2015, and* claims priority under 35 U.S.C. § 119 to Korean Patent Application No. 10-2014-0156134[.] filed on Nov. 11, 2014, in the Korean Intellectual Property Office, the [disclosure] *disclosures* of which [is] *are* incorporated herein by reference in [its entirety] *their entireties. This reissue application is also for a reissue of U.S. Pat. No. 9,836,961.*

TECHNICAL FIELD

The present invention relates to a system and a method for providing position information of vehicles travelling around a travelling vehicle, and particularly, to a system and a method for correcting an error of position information of vehicles travelling in a surrounding area, and providing information of surrounding vehicles based on the corrected position information.

BACKGROUND

An advanced driver assistance system (ADAS) is a system assisting driving based on information obtained through a sensor or communication for safety and convenience for a driver, and an autonomous emergency braking (AEB) system, a forward collision warning (FCW) system, and the like are present as systems for preventing a collision with a vehicle travelling at a front side.

The AEB system or the FCW system may provide safe driving services according to information obtained through a sensor, or give a warning to a driver or self-control a vehicle based on information, such as deceleration or emergency braking of a vehicle travelling at a front side, in information received from surrounding vehicles through vehicle-to-vehicle (V2V) communication, thereby reducing risk of an accident.

In this case, when the AEB system or the FCW system provides safe driving services based on the information received through the V2V communication, it is necessary to identify whether the received information is information of the vehicle travelling at the front side, so that the information received from the vehicle travelling at the front side is identified based on position information received from surrounding vehicles and information of a mad which the vehicle travels on.

However, the position information received from the surrounding vehicles is based on a global positioning system (GPS) signal of the surrounding vehicles, and when an error is generated in the UPS signal, there is a problem in that incorrect position information of the surrounding vehicles may be received.

SUMMARY

The present invention has been made in an effort to provide a system and a method of correcting position information of a surrounding vehicle, which are capable of obtaining information of a front vehicle through a sensor, identifying the information of the front vehicle in information received from a surrounding vehicle, and comparing a position of the front vehicle obtained through the sensor and position information of the front vehicle received through vehicle-to-vehicle communication, thereby accurately correcting position information received from the surrounding vehicle.

An exemplary embodiment of the present invention provides a system for correcting position information of a surrounding vehicle, the system including: a front vehicle information obtaining unit configured to obtain a license-plate number of a front vehicle, which is travelling at a front side, measure a distance to the front vehicle, and calculate a position of the front vehicle; a surrounding vehicle information receiving unit configured to receive a number and position information of a surrounding vehicle, which is travelling in a surrounding area; a position information correcting unit configured to search for a license-plate number a surrounding vehicle corresponding to the license-plate number of the front vehicle, which is travelling at the front side, among the license-plate numbers of the surrounding vehicles received by the surrounding vehicle information receiving unit, compare position information of a surrounding vehicle, which transmits the searched number of the surrounding vehicle, with a position of the front vehicle, which is travelling at the front side, and correct the position information of the surrounding vehicle, which is travelling in the surrounding area, according to a result of the comparison; and a display unit configured to display a position of the surrounding vehicle, which is travelling in the surrounding area, according to the position information corrected by the position information correcting unit.

The position information correcting unit may calculate a correction value based on a difference between the position information of the surrounding vehicle, which transmits the searched number of the surrounding vehicle, and the position of the front vehicle, which is travelling at the front side, and correct the position information of the surrounding vehicle, which is received by the surrounding vehicle information receiving unit, according to the calculated correction value.

The position information correcting unit may generate a travel map of the surrounding vehicle, which is travelling in the surrounding area, according to the corrected position information.

When the position information of the surrounding vehicle, which transmits the searched number of the surrounding vehicle, is within a predetermined range from the position of the front vehicle, which is travelling at the front side, the position information correcting unit may generate a travel map of the surrounding vehicle, which is travelling in the surrounding area, according to the position information of the surrounding vehicle received by the surrounding vehicle information receiving unit.

The front vehicle information obtaining unit may calculate a position of the front vehicle, which is travelling at the front side, by using the measured distance to the front vehicle, information of a mad, which the vehicle is travelling on, and a current position of the vehicle.

In this case, the information of the road may include total lanes and a curvature of the road which the vehicle is travelling on.

The front vehicle information obtaining unit may calculate a relative position of the front vehicle with respect to the current position of the vehicle by using the measured distance to the front vehicle, and when a road, which the vehicle is travelling on, is a curved mad, the front vehicle information obtaining unit may calculate a relative position of the front vehicle with respect to the current position of the vehicle by using the measured distance to the front vehicle and a direction of the front vehicle.

The front vehicle information obtaining unit may obtain the license-plate number of the front vehicle, which is travelling at the front side, through a camera sensor, and measure a distance to the front vehicle through a radar or a laser scanner.

Another exemplary embodiment of the present invention provides a method for correcting position information of a surrounding vehicle, the method including: obtaining a license-plate number of a front travelling vehicle, and calculating a position of the front travelling vehicle; receiving a number and position information of a surrounding vehicle, which is travelling in a surrounding area; searching for a surrounding vehicle having a number corresponding to the license-plate number of the front travelling vehicle among the received numbers of surrounding vehicles; and correcting position information of the searched surrounding vehicle according to a position of the front travelling vehicle.

According to the present invention, it is possible to prevent a position of a vehicle from being inaccurately recognized due to an error of a GPS signal, and correct even position information of a vehicle, which is being travelling in an area, which is not detected by the sensor, by correcting position information of a surrounding vehicle received through the V2V communication based on information of a front vehicle obtained through the sensor.

DETAILED DESCRIPTION OF EMBODIMENTS

Various advantages and features of the present invention and methods accomplishing thereof will become apparent from the following detailed description of exemplary embodiments with reference to the accompanying drawings. However, the present invention is not limited to exemplary embodiments disclosed herein, but will be implemented in various forms. The exemplary embodiments arc provided so that the present invention is completely disclosed, and a person of ordinary skill in the art can fully understand the scope of the present invention, and the present invention will be defined by the scope of the appended claims.

Meanwhile, terms used in the present specification are to explain exemplary embodiments rather than limiting the present invention. Unless particularly stated otherwise in the present specification, a singular form also includes a plural form. The meaning of "comprises" and/or "comprising" used in this specification does not exclude the existence or addition of one or more other constituent elements, steps, operations, and/or devices in addition to aforementioned constituent elements, steps, operations, and/or device. Hereinafter, exemplary embodiments of the present invention will be described in detail with reference to the accompanying drawings.

Figure 1A:
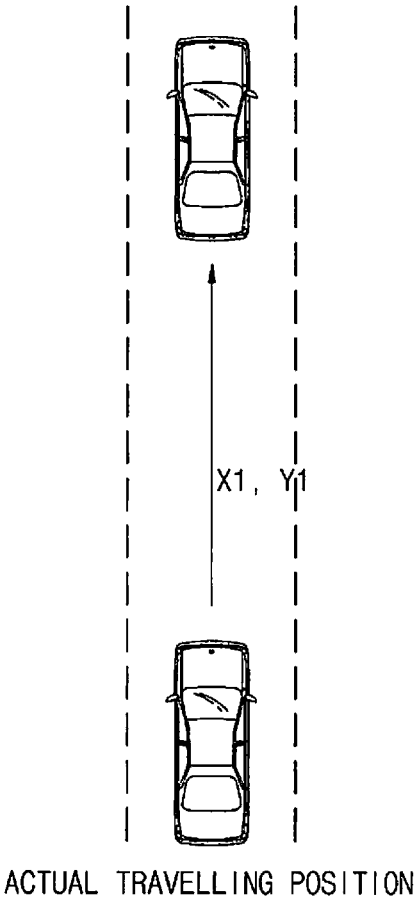
FIGS. 1A and 1B arc diagrams illustrating an example of a case where a correction of position information is demanded by a system for correcting position information of a surrounding vehicle according to an exemplary embodiment of the present invention.
Figure 1B:
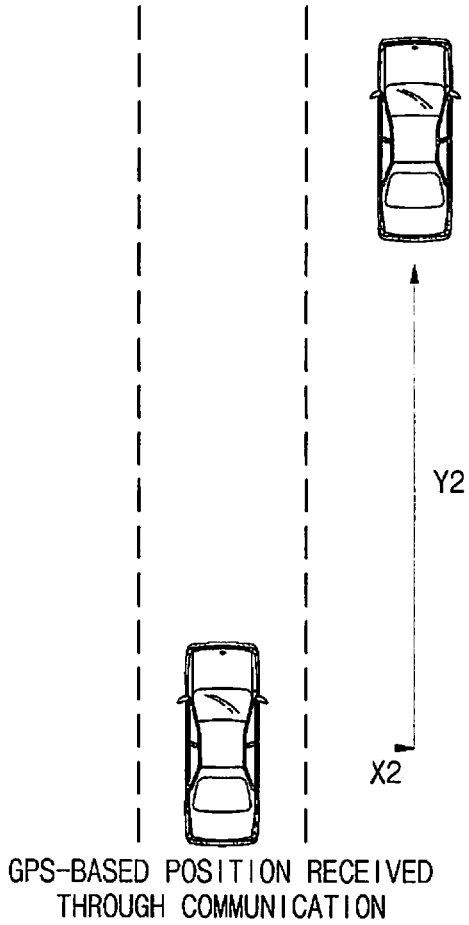

FIGS. 1A and 1B are diagrams illustrating an example of a case where incorrect position information is received from a surrounding vehicle, and FIG. 1A illustrates actual travelling positions of a vehicle and a surrounding (front) vehicle, and FIG. 1B illustrates a case where a position of a surrounding vehicle is recognized based on a global positioning system (GPS) signal received from the surrounding vehicle, and an incorrect position is recognized due to an error of the GPS signal.

That is, actually, the vehicle is travelling in a state illustrated in FIG. 1A, but the vehicle recognizes a travelling situation as a travelling situation illustrated in FIG. 1B due to an error of a GPS signal received from a surrounding vehicle, and even though emergency braking information is received from the surrounding vehicle, the surrounding vehicle is not recognized as a front vehicle travelling on the same lane, so that there is a problem in that an advanced driver assistance system (ADAS) is not operated. A system for correcting position information of a surrounding vehicle according to an exemplary embodiment of the present invention is to solve the aforementioned problem, and hereinafter, a system and a method for correcting position information of a surrounding vehicle according to an exemplary embodiment of the present invention will be described with reference to FIGS. 2 and 3.

Figure 2:
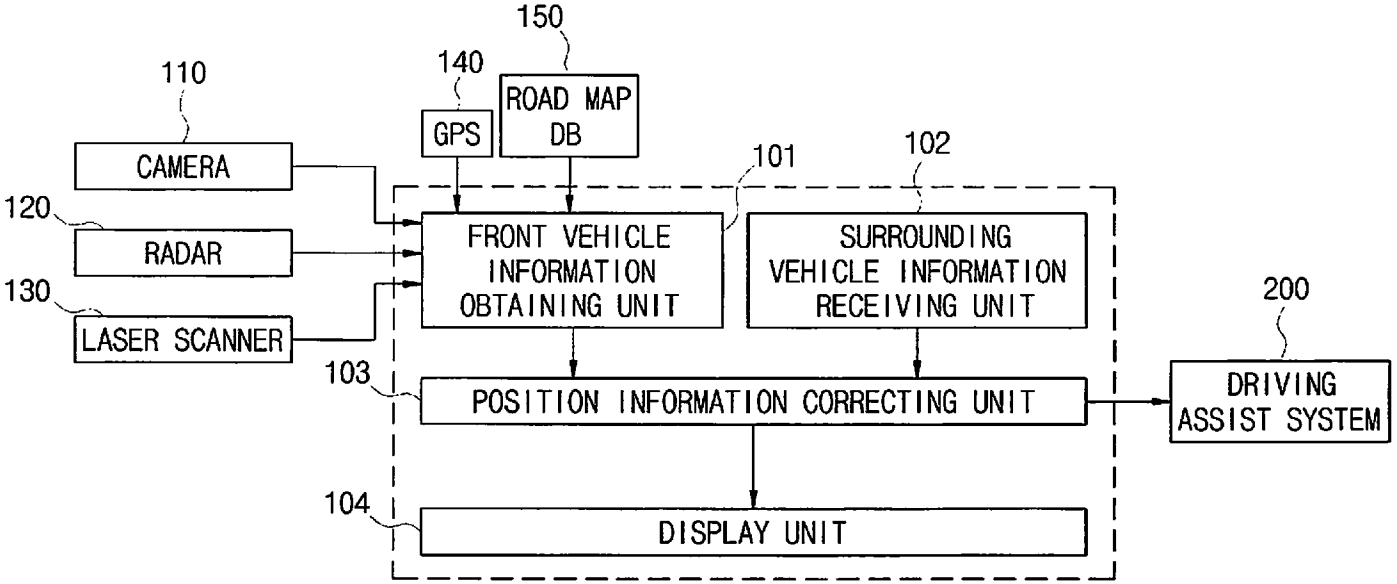
FIG. 2 is a block diagram illustrating a structure of the system for correcting position information of a surrounding vehicle according to the exemplary embodiment of the present invention.

FIG. 2 illustrates a structure of a system for correcting position information of a surrounding vehicle according to an exemplary embodiment of the present invention.

A system [100] for correcting position information of a surrounding vehicle according to an exemplary embodiment of the present invention includes a front vehicle information obtaining unit 101, a surrounding vehicle information receiving unit 102, a position information correcting unit [130.] *103,* and a display unit 104.

The front vehicle information obtaining unit 101 obtains a license-plate number of a vehicle travelling at a front side of the vehicle, measures a distance to the front vehicle, and calculates a position of the front vehicle based on the measured distance.

The front vehicle information obtaining unit 101 processes an image photographed through a camera 110 mounted in the vehicle, and identifies the license-plate number of the front vehicle. That is, the front vehicle information obtaining unit 101 obtains the license-plate number of the front vehicle and uses the obtained number of the front vehicle for identifying information received from the vehicle travelling at the front side among information received from surrounding vehicles.

The front vehicle information obtaining unit 101 measures a distance to the front vehicle through a radar 120 or a laser scanner 130 mounted in the vehicle.

The front vehicle information obtaining unit 101 may calculate a position of the front vehicle by using the distance to the front vehicle measured through the radar 120 or the laser scanner 130, a current position of the vehicle calculated based on a signal of a GPS 140, and information of a road, which the vehicle is travelling on, obtained from a road map DB 150. In this case, the road map DB 150 provides information, such as the total lanes [ad] *and* a curvature of the road, which the vehicle is travelling on.

Otherwise, the front vehicle information obtaining unit 101 may calculate a relative position (for example, 00 in in an X-axis and 00 m in a Y-axis) of the front vehicle with respect to the current position of the vehicle by using the distance to the front vehicle, and calculate a relative position of the front vehicle by using a distance to the front vehicle and a direction of the front vehicle while the vehicle travels a curved road.

The front vehicle information obtaining unit 101 transmits the obtained number of the front vehicle and the calculated position of the front vehicle to the position information correcting unit 103.

The surrounding vehicle information receiving unit 102 receives travelling information of a surrounding vehicle from the surrounding vehicles, which are travelling in an area, in which the surrounding vehicles may be communicated with the vehicle through V2V communication, and the travelling information includes a license-plate number of the surrounding vehicle and position information of the surrounding vehicle.

The surrounding vehicle information receiving unit 102 transmits the received number and position information of the surrounding vehicle to the position information correcting unit 103.

The position information correcting unit 103 compares the information of the front vehicle received from the front vehicle information obtaining unit 101 and the information of the surrounding vehicle received from the surrounding vehicle information receiving unit 102, corrects the position information of the surrounding vehicle, and generates a travel map of the surrounding vehicle according to the corrected position information.

The position information correcting unit 103 searches for information of the surrounding vehicle including the same license-plate number as the license-plate number of the front vehicle in the information of the surrounding vehicle received from the surrounding vehicle information receiving unit 102.

When the information of the surrounding vehicle including the same license-plate number as the license-plate number of the front vehicle is confirmed, the position information correcting unit 103 may recognize that the confirmed information of the surrounding vehicle is the information transmitted by the vehicle actually travelling at the front side, so that the position information correcting unit 103 compares the position information received from the corresponding surrounding vehicle with the position of the front vehicle received from the front vehicle information obtaining unit 101.

When the position information received from the surrounding vehicle, which is recognized as the front vehicle, is the same as the position of the front vehicle calculated by the front vehicle information obtaining unit 101 or is within a predetermined range from the position of the front vehicle, the position information received from the surrounding vehicle may be considered as accurate information having no error, so that the position information correcting unit 103 generates the travel map of the surrounding vehicle, which is travelling around the vehicle, according to the position information received from the surrounding vehicle.

When a distance between the position information received from the surrounding vehicle and the position calculated by the front vehicle information obtaining unit 101 is out of a predetermined range, the position information correcting unit 103 may recognize that the position information from the surrounding vehicle is inaccurate information due to an error of the GPS.

Accordingly, the position information correcting unit 103 calculates a correction value according to the difference between the position information received from the surrounding vehicle and the position calculated by the front vehicle information obtaining unit 101, and corrects the position information received from the surrounding vehicle according to the calculated correction value.

In this case, the position information correcting unit 103 may correct only the position information received from the surrounding vehicle, which is recognized as the front vehicle, according to the calculated correction value, but may also correct position information of all of the surrounding vehicles received by the surrounding vehicle information receiving unit 102 according to the calculated correction value.

The position information correcting unit 103 may generate a travel map of the surrounding vehicle, which is travelling around the vehicle, based on the corrected position information, and display the generated travel map through a display unit 104, thereby providing a driver with accurate position information of the surrounding vehicle which is travelling in a surrounding area.

The position information correcting unit 103 transmits the corrected position information of the surrounding vehicle or the generated travel map to a driving assist system 200 to enable the driving assist system 200 to use the corrected position information of the surrounding vehicle or the generated travel map for identifying the information of the front vehicle.

Accordingly, according to the present invention, the position information, which is received from the surrounding vehicle recognized as the front vehicle in the position information of the surrounding vehicles received through the V2V communication is compared with the position of the front vehicle calculated based on the information obtained through the sensor and corrected, so that even through the position information received through the V2V communication has an error, it is possible to provide a driver or the driving assist system 200 with accurate position information.

Figure 3:
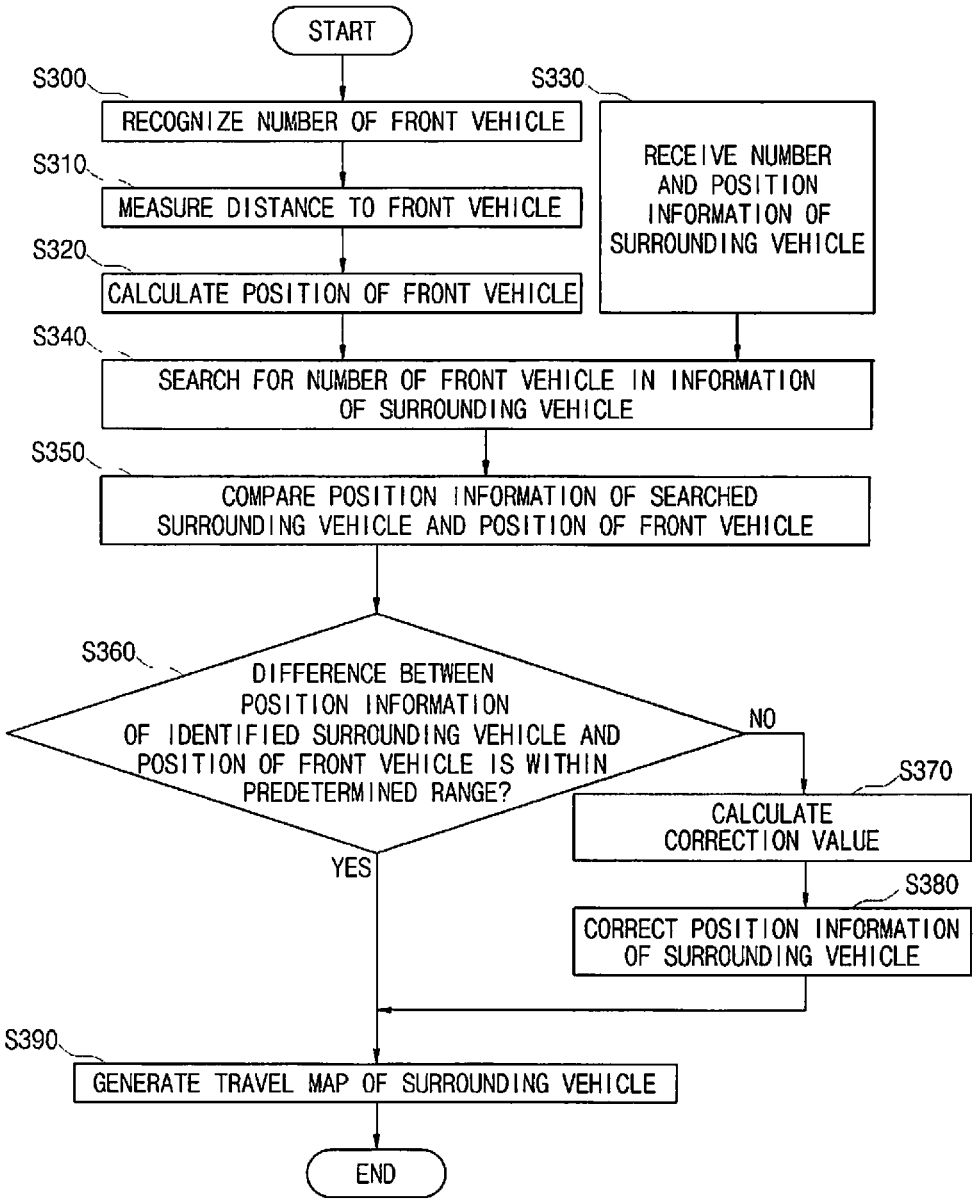
FIG. 3 is a flowchart illustrating a process of a method of correcting position information of a surrounding vehicle according to another exemplary embodiment of the present invention.

FIG. 3 is a flowchart illustrating a process of a method of correcting position information of a surrounding vehicle according to another exemplary embodiment of the present invention.

The system for correcting position information of a surrounding vehicle according to the exemplary embodiment of the present invention may compare position information of a surrounding vehicle received from the surrounding vehicle and information of a front vehicle obtained through the sensor and correct the position information of the surrounding vehicle to provide accurate position information of the surrounding vehicle.

The system for correcting position information of a surrounding vehicle recognizes a license-plate number of a vehicle, which is travelling at a front side, through a camera mounted in the vehicle (S300), and measures a distance to the front vehicle using a radar, and the like (S310). Further, the system for correcting position information of a surrounding vehicle calculates a position of the front vehicle based on a distance to the front vehicle and a current position of the vehicle and information of a road which the vehicle travels on (S320).

That is, the present invention may correct even position information of vehicles travelling in an area, which is not detected by the sensor, by determining accuracy of the position information received through the V2V communication based on the information of the front vehicle.

The system for correcting position information of a surrounding vehicle obtains the information of the front vehicle, and receives travel information including a number and position information of the surrounding vehicle from the surrounding vehicle (S330).

The system for correcting position information of a surrounding vehicle searches for information including the same license-plate number as the license-plate number of the front vehicle in the information received from the surrounding vehicle (S340).

When the information including the same license-plate number as the license-plate number of the front vehicle is identified in the information received from the surrounding vehicle, the system for correcting position information of a surrounding vehicle may recognize that the identified surrounding vehicle is the vehicle travelling at the front side, so that the system for correcting position information of a surrounding vehicle compares the position information of the identified surrounding vehicle with the obtained position of the front vehicle obtained through the sensor (S350).

When the position information of the identified surrounding vehicle is the same as the position of the front vehicle obtained through the sensor, or a difference between the position information of the identified surrounding vehicle and the position of the front vehicle obtained through the sensor is within a predetermined range (S360), the position information received from the surrounding vehicle may be determined as information having no error, so that the system for correcting position information of a surrounding vehicle provides the received position information to the driving assist system or generates a travel map of the surrounding vehicle based on the received position information (S390).

When the difference between the position information of the identified surrounding vehicle and the position of the front vehicle obtained through the sensor is out of the predetermined range (S360), the position information received from the surrounding vehicle may be considered as inaccurate information due to an error of GPS information, so that the system for correcting position information of a surrounding vehicle calculates a correction value based on the difference between the received position information and the position of the front vehicle (S370).

The system for correcting position information of a surrounding vehicle corrects the received position information according to the calculated correction value (S380). In this case, the system for correcting position information of a surrounding vehicle may also correct position information of a surrounding vehicle, which is travelling in an area that is communication available with a vehicle, but is not detected by the sensor, by correcting all of the received position information of the surrounding vehicles according to the calculated correction value.

Accordingly, according to the present invention, it is possible to provide a driver with accurate position information of a surrounding vehicle by correcting an error of position information received from the surrounding vehicle, and provide accurate driving assist services according to a travel situation of a front vehicle by enabling the driving assist system to accurately identify information of a front vehicle received through the V2V communication.

Although an exemplary embodiment of the present invention has been described for illustrative purposes, those skilled in the art will appreciate that various modifications and changes are possible, without departing from the scope and spirit of the invention. Accordingly, the exemplary embodiments disclosed in the present invention are not intended to limit but illustrate the technical spirit of the present invention, and the scope of the technical spirit of the present invention is not limited by the exemplary embodiments. The protection scope of the present invention should be construed based on the following appended claims and it should be interpreted that all the technical spirit included within the scope identical or equivalent to the claims belongs to the scope of the present invention.

What is claimed is:

[1. An apparatus in a first vehicle to correct position information of a surrounding vehicle, the surrounding vehicle being located in a surrounding area of the first vehicle, the apparatus comprising:

a front vehicle location unit configured to obtain a license-plate number of a second vehicle that is travelling in front of the first vehicle, measure a distance from the first vehicle to the second vehicle, and calculate a position of the second vehicle;

a surrounding vehicle information receiving unit configured to receive license-plate numbers and position information of one or more surrounding vehicles that are travelling in the surrounding area of the first vehicle;

a position information correcting unit configured to search for the license-plate number of the second vehicle among the license-plate numbers of the one or more surrounding vehicles received by the surrounding vehicle information receiving unit, compare the calculated position information of the second vehicle among the position information of the one or more surrounding vehicles with a received position information of the second vehicle received from the surrounding vehicle information receiving unit, correct the received position information of the second vehicle according to a result of the comparing, and transmit the corrected position information to a driving assist system to prevent a collision between the first vehicle and the second vehicle, wherein the collision between the first vehicle and the second vehicle is prevented by an autonomous emergency braking system.]

[2. The apparatus of claim 1, wherein the position information correcting unit is further configured to calculate a correction value based on a difference between the received position information of the second vehicle and the calculated position of the second vehicle, and to correct the received position information of the second vehicle according to the calculated correction value.]

[3. The apparatus of claim 2, further comprising a display, wherein the position information correcting unit is further configured to generate a travel map of the second vehicle according to the corrected position information, and to display the generated travel map on the display.]

[4. The apparatus of claim 1, wherein, the position information correcting unit is further configured to generate a travel map of the second vehicle according to the received position information of the second vehicle when the received position information of the second vehicle is within a range from the calculated position of the second vehicle.]

[5. The apparatus of claim 1, wherein the front vehicle location unit is further configured to calculate the calculated position of the second vehicle using the measured distance to the second vehicle, information of a road on which the first vehicle is travelling, and a current position of the first vehicle.]

[6. The apparatus of claim 5, wherein the information of the road comprises total lanes and a curvature of the road on which the first vehicle is travelling.]

[7. The apparatus of claim 6, wherein the front vehicle location unit is further configured to calculate a relative position of the second vehicle with respect to the current position of the first vehicle using the measured distance to the second vehicle, and in response to the road on which the first vehicle is travelling being a curved road, to calculate a relative position of the second vehicle with respect to the current position of the first vehicle using the measured distance to the second vehicle and a direction of the second vehicle.]

[8. The apparatus of claim 1, wherein the front vehicle location unit is further configured to obtain the license-plate number of the second vehicle through a camera, and to measure the distance to the second vehicle through a radar or a laser scanner.]

[9. The apparatus of claim 1, further comprising:

a display unit configured to display a position of the second vehicle according to the position information which is corrected by the position information correcting unit.]

[10. A method to correct position information of a surrounding vehicle, the method comprising:

obtaining, by a camera, a license-plate number of a front travelling vehicle, and determining, by a measurement device, a calculated position of the front travelling vehicle;

receiving a license-plate number and position information of one or more surrounding vehicles that are travelling in a surrounding area;

searching for a surrounding vehicle comprising a license-plate number corresponding to the license-plate number of the front travelling vehicle among the received license-plate numbers of surrounding vehicles to determine a matching surrounding vehicle;

correcting received position information of the matching surrounding vehicle according to the calculated position of the front travelling vehicle; and transmitting the corrected position information to a driving assist system to prevent a collision with the surrounding vehicle, wherein the collision with the surrounding vehicle is prevented by an autonomous emergency braking system.]

[11. The method of claim 10, wherein the determining of the position of the front travelling vehicle comprises measuring a distance to the front travelling vehicle, and calculating the position of the front travelling vehicle using the measured distance, information of a road on which the first vehicle is travelling, and a current position of the first vehicle.]

[12. The method of claim 11, wherein the determining of the position of the front travelling vehicle comprises calculating a relative position of the front travelling vehicle with respect to the current position of the first vehicle using the measured distance to the front travelling vehicle, and when a road on which the first vehicle is travelling is a curved road, calculating a relative position of the front travelling vehicle with respect to the current position of the first vehicle using the measured distance to the front travelling vehicle and a direction of the front travelling vehicle.]

[13. The method of claim 10, wherein the correcting of the received position information of the matching surrounding vehicle according to the position of the front travelling vehicle comprises:

calculating a correction value according to a difference between the received position information of the matching surrounding vehicle and the calculated position of the front travelling vehicle; and correcting the received position information of the matching surrounding vehicle according to the calculated correction value.]

[14. The method of claim 10, wherein the correcting of the received position information of the matching surrounding vehicle according to the calculated position of the front travelling vehicle comprises generating a travel map of the matching surrounding vehicle according to the received position information of the matching surrounding vehicle when the received position information of the matching surrounding vehicle is within a range from the calculated position of the front travelling vehicle.]

[15. The method of claim 11, wherein the measuring of the distance to the front travelling vehicle comprises measuring by either one of a radar device and a laser device.]

[16. The apparatus of claim 1, wherein the collision between the first vehicle and the second vehicle is further prevented by a forward collision warning system.]

[17. The method of claim 10, wherein the collision with the surrounding vehicle is further prevented by a forward collision warning system.]

*18. An apparatus in a first vehicle to correct position information of a surrounding vehicle, the apparatus comprising:*

*a front vehicle location unit comprising one or more processors configured to:*

*obtain identifier information of a second vehicle that is travelling in front of the first vehicle while the first vehicle is travelling on a curved road,*

*measure a distance from the first vehicle to the second vehicle, and*

*determine a relative position of the second vehicle with respect to a current position of the first vehicle using the measured distance from the first vehicle to the second vehicle;*

*a surrounding vehicle information receiver configured to receive identifier information and position information of one or more surrounding vehicles; and*

*a position information correcting unit comprising one or more processors configured to:*

*identify a surrounding vehicle comprising identifier information corresponding to the identifier information of the front travelling vehicle among the received identifier information of the one or more surrounding vehicles as being a matching surrounding vehicle corresponding to the front travelling vehicle,*

*compare the determined relative position of the second vehicle with received position information of the matching surrounding vehicle among the received position information of the one or more surrounding vehicles,*

*correct the received position information of the matching surrounding vehicle according to a result of the comparing, and*

*transmit the corrected position information of the matching surrounding vehicle to a driving assist system to prevent a collision between the first vehicle and the second vehicle,*

*wherein the collision between the first vehicle and the second vehicle is prevented by a forward collision warning system.*

*19. The apparatus of claim 18, wherein the front vehicle location unit comprising one or more processors is further configured to measure the distance from the first vehicle to the second vehicle using a radar or a laser scanner.*

*20. The apparatus of claim 18, wherein the front vehicle location unit comprising one or more processors is further configured to determine the relative position of the second vehicle using information of the curved road.*

*21. The apparatus of claim 20, wherein the information of the curved road comprises a total number of lanes and a curvature of the curved road.*

*22. The apparatus of claim 18, wherein the front vehicle location unit comprising one or more processors is further configured to determine the relative position of the second vehicle using a direction of the second vehicle.*

*23. The apparatus of claim 18, wherein the forward collision warning system is configured to prevent the collision between the first vehicle and the second vehicle based on the corrected position information of the matching surrounding vehicle.*

*24. The apparatus of claim 18, wherein the position information correcting unit comprising one or more processors is further configured to:*

*determine a correction value based on a difference between the determined relative position of the second vehicle and the received position information of the matching surrounding vehicle, and*

*correct the received position information of the matching surrounding vehicle according to the determined correction value.*

*25. The apparatus of claim 24, wherein the position information correcting unit comprising one or more processors is further configured to correct the received position information of all of the one or more surrounding vehicles according to the determined correction value.*

*26. The apparatus of claim 18, wherein the position information correcting unit comprising one or more processors is further configured to generate a travel map of the matching surrounding vehicle according to the corrected position information of the matching surrounding vehicle.*

*27. A method performed in a first vehicle to correct position information of a surrounding vehicle, the method comprising:*

*obtaining, by a camera, identifier information of a front travelling vehicle that is travelling in front of the first vehicle while the first vehicle is travelling on a curved road;*

*determining, by a measurement device, a relative position of the front travelling vehicle with respect to a current position of the first vehicle;*

*receiving identifier information and position information of one or more surrounding vehicles that are travelling in a surrounding area of the first vehicle;*

*identifying a surrounding vehicle comprising identifier information corresponding to the identifier information of the front travelling vehicle among the received identifier information of the one or more surrounding vehicles as being a matching surrounding vehicle corresponding to the front travelling vehicle;*

*correcting the received position information of the matching surrounding vehicle among the received position information of the one or more surrounding vehicles according to the determined relative position of the front travelling vehicle, and*

*transmitting the corrected position information of the matching surrounding vehicle to a driving assist system to prevent a collision with the front travelling vehicle,*

*wherein the collision with the front travelling vehicle is prevented by a forward collision warning system.*

*28. The method of claim 27, wherein the determining of the relative position of the front travelling vehicle comprises:*

*measuring, by the measurement device, a distance from the first vehicle to the front travelling vehicle, and*

*determining the relative position of the front travelling vehicle using the measured distance from the first vehicle to the front travelling vehicle.*

*29. The method of claim 27, wherein the determining of the relative position of the front travelling vehicle comprises determining the relative position of the front travelling vehicle using information of the curved road, and*

*the information of the curved road comprises a total number of lanes and a curvature of the curved road.*

*30. The method of claim 27, wherein the collision between the first vehicle and the front travelling vehicle is prevented by a forward collision warning system of the driving assist system based on the corrected position information of the matching surrounding vehicle.*

*31. The method of claim 27, wherein the correcting of the received position information of the matching surrounding vehicle according to the determined relative position of the front travelling vehicle comprises:*

*determining a correction value according to a difference between the received position information of the matching surrounding vehicle and the determined relative position of the front travelling vehicle; and*

*correcting the received position information of the matching surrounding vehicle according to the determined correction value.*

*32. The method of claim 31, wherein the correcting of the received position information of the matching surrounding vehicle according to the determined correction value comprises correcting the received position information of all of the one or more surrounding vehicles according to the determined correction value.*

*33. The method of claim 27, wherein the receiving of the identifier information and the position information com-*

*prises receiving the identifier information and the position information from the one or more surrounding vehicles via vehicle-to-vehicle (V2V) communication, and*

*the correcting of the received position information comprises correcting the received position information of the matching surrounding vehicle received via the vehicle-to-vehicle (V2V) communication according to the determined relative position of the front travelling vehicle.*

*34. The method of claim 27, wherein the obtaining of the identifier information of the front travelling vehicle, the determining of the relative position of the front travelling vehicle, the receiving of the identifier information and the position information of the one or more surrounding vehicles, the identifying of the surrounding vehicle, the correcting of the received position information, and the transmitting of the corrected position information of the matching surrounding vehicle are collectively performed in sufficient time to enable the driving assist system to prevent the collision with the front travelling vehicle based on the corrected position information of the matching surrounding vehicle.*

*35. The method of claim 27, further comprising generating a travel map of the matching surrounding vehicle according to the corrected position information of the matching surrounding vehicle.*

* * * * *